Dec. 16, 1958   L. J. ZIEGELMEYER   2,864,342
HYDRAULICALLY OPERATED MOTOR AND CONTROL MEANS THEREFOR
Filed Aug. 29, 1955   2 Sheets-Sheet 1

LYNN J. ZIEGELMEYER
INVENTOR.

BY Paul A. Weilein
ATTORNEY.

Dec. 16, 1958     L. J. ZIEGELMEYER     2,864,342
HYDRAULICALLY OPERATED MOTOR AND CONTROL MEANS THEREFOR
Filed Aug. 29, 1955     2 Sheets-Sheet 2
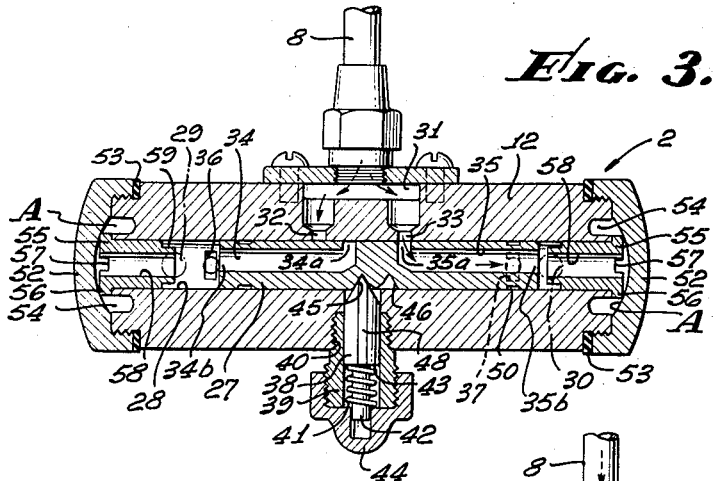
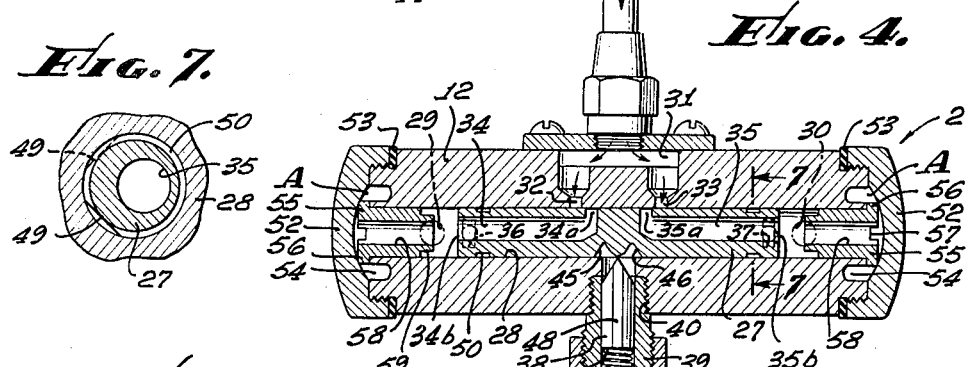
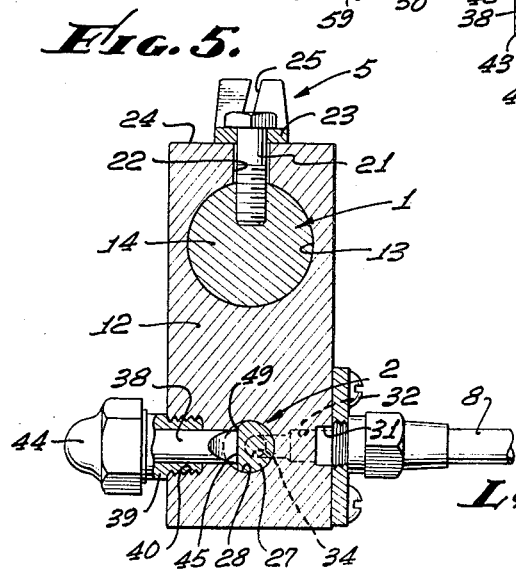
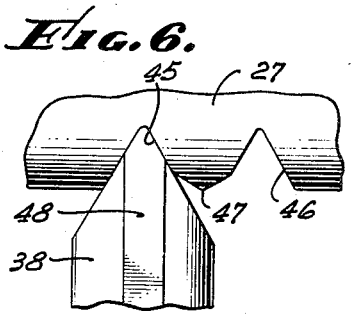
LYNN J. ZIEGELMEYER
INVENTOR.
BY Paul A. Weilein
ATTORNEY.

United States Patent Office 2,864,342
Patented Dec. 16, 1958

2,864,342

HYDRAULICALLY OPERATED MOTOR AND CONTROL MEANS THEREFOR

Lynn J. Ziegelmeyer, Klamath Falls, Oreg.

Application August 29, 1955, Serial No. 530,994

21 Claims. (Cl. 121—150)

This invention relates to hydraulically operated motors and more particularly to hydraulically operated motors and control means therefor such as may be used for operating windshield wipers.

It is an object of this invention to provide a hydraulic motor and control means therefor which, as a novel unit, constitutes an improvement in this art in point of its simplicity of construction, compactness, low cost and reliability of performance.

Another object of this invention is the provision of a novel hydraulic motor and control unit which embodies a single fluid pressure operated valve that functions automatically without depending upon numerous ports, passages and related valves to control and operate the motor, for example, in a manner for efficiently operating windshield wipers.

Another object of this invention is the provision of a motor such as described which when employed for operating a windshield wiper will reverse the wiper should an obstruction on the windshield, such as snow or ice, interfere with the wiper making a full stroke, and continue the operation of the wiper with a shortened stroke until the obstruction is removed, then return to full stroke operation.

It is another object of this invention to provide a reciprocating hydraulically operated motor and control unit such as described, wherein a single flow reversing valve is actuated in a reliable manner by means of hydraulic pressure and novel force applying means. The hydraulic pressure for operating the valve is produced when the hydraulic pressure increases incident to the motor completing a stroke, also in event the motor is loaded to the point that normal operation thereof is restrained. The novel force applying means for cooperation with this increased pressure, develops its force by the hydraulic pressure in the valve and motor, and applies the developed force to move the valve when the hydraulic pressure to the valve and motor is shut off.

It is another object of this invention to provide a reciprocable motor and control unit such as described, in which a single control valve is actuated in a novel manner by the combined action of hydraulic pressure and compressed air.

Further, it is an object of this invention to provide a motor and control unit such as described, wherein air chambers are arranged in a novel manner so that air contained therein will be compressed responsive to hydraulic pressure applied to the motor, and wherein this compressed air will be effective to move the single control valve into flow revering positions incident to the valve momentarily shutting off the hydraulic pressure to the motor as it is moved between flow reversing positions.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention, but it is to be understood that this detailed description is not to be taken in a limiting sense, since the scope of the invention is best defined by the appended claims.

Referring to the drawings:

Fig. 3 is a sectional view taken on the line 3—3 of Fig. 2;

Fig. 4 is a sectional view corresponding to Fig. 3, showing the flow reversing valve in a different position from that shown in Fig. 3;

Fig. 5 is a sectional view taken on the line 5—5 of Fig. 2;

Fig. 6 is an enlarged fragmentary elevational view of the detent member and portion of the valve associated therewith; and Fig. 7 is a cross sectional view taken on the line 7—7 of Fig. 4.

Figure 1:
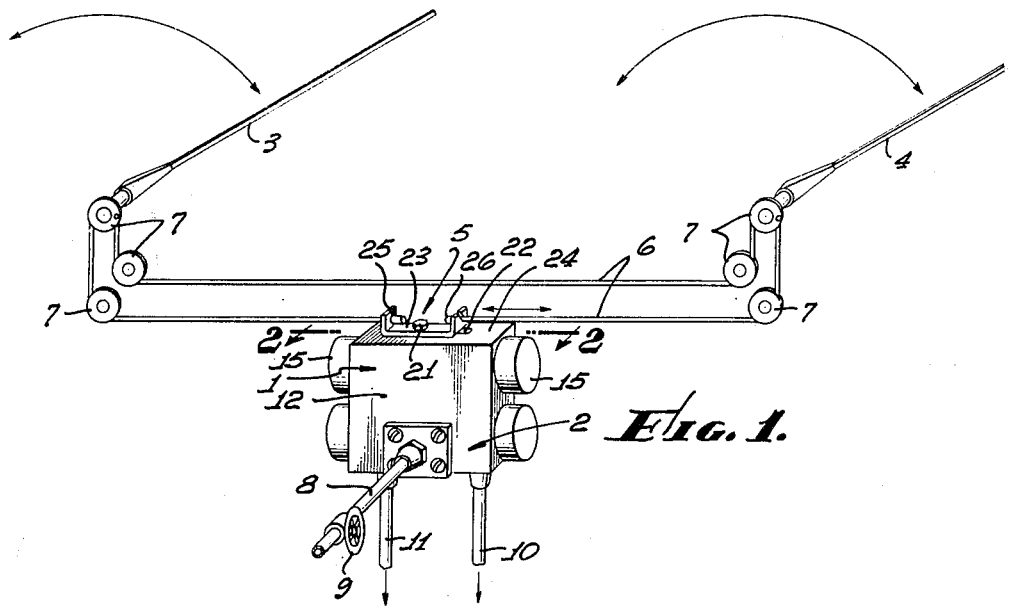
Fig. 1 is a perspective view of a hydraulic motor and control unit embodying the present invention, as employed for operating a pair of windshield wipers.

One form of this invention, as shown in the accompanying drawings, generally comprises a hydraulic motor 1 and valve means 2 for controlling the motor. The motor and the valve means may be combined as a small compact unit which, as shown in Fig. 1 to illustrate one use thereof, is employed for operating a pair of windshield wipers 3 and 4. In this use, the motor 1 is provided with power take-off means 5, which is connected with a flexible drive element 6 engaged with a series of pulleys 7 arranged whereby the one motor will oscillate the wipers simultaneously.

A pipe line 8 leading from a source (not shown) of hydraulic fluid under pressure, and provided with a suitable valve 9, is connected with the valve means 2 to supply fluid under pressure for operating the motor 1. Fluid return lines 10 and 11 lead from the valve means 2 to the source of pressure fluid, thereby providing a hydraulically filled and closed system for operating the motor. The valve 9, in any suitable form, is used for starting and stopping the motor and may be used to regulate the speed of the motor.

Referring more specifically to the construction of the motor and valve unit, it is seen that it includes a body 12 of generally rectangular form in which the motor unit 1 comprises a power cylinder 13 and a power piston 14. The cylinder 13 is closed and sealed at its ends by screw threaded plugs 15 and sealing rings 16. These plugs have reduced inner ends 17 which act as stops for limiting the stroke of the piston 14 as the reduced ends 18 of the piston strike the ends 17. Piston rings 19 of synthetic rubber are mounted in grooves 20 in the reduced ends 18 of the piston 14.

Figure 2:
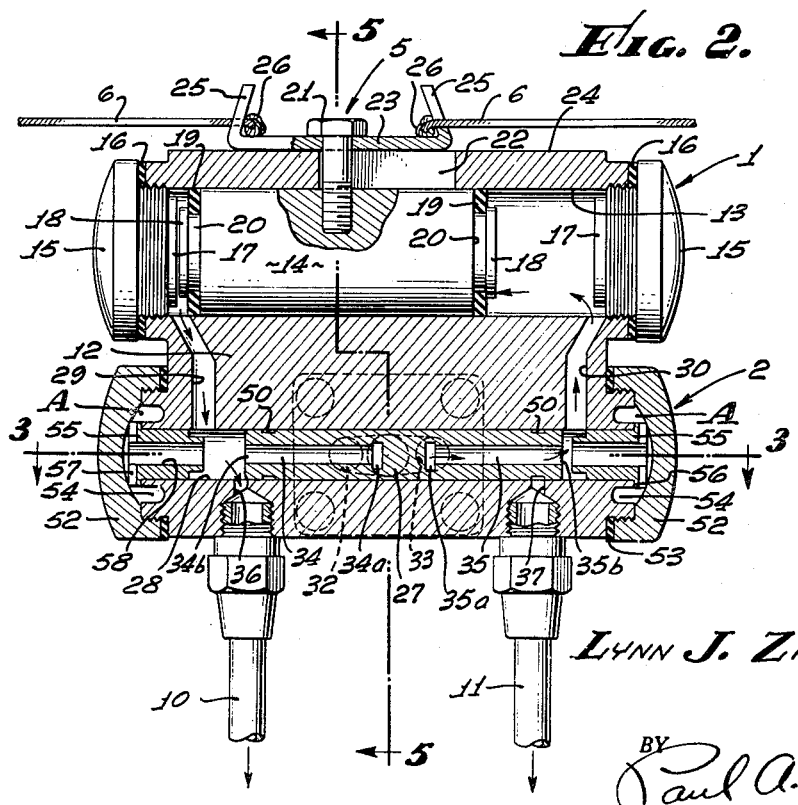
Fig. 2 is an enlarged sectional view taken on the line 2—2 of Fig. 1, showing the piston and power take-off means in a different position from that indicated in Fig. 1.

One form of power take-off means 5 for the motor 1 comprises a bolt 21 threaded into the power piston 14 and slideable in a slot 22 in the cylinder 13. This bolt mounts a U-shaped member 23 for sliding movement over a flat surface 24 of the cylinder 13. The bifurcated ends 25 of the member 23 provide for connection of the knotted ends 26 of the flexible drive element 6 with the member 23, as shown in Figs. 1 and 2.

As will be hereinafter fully described, the valve means 2 will reverse the flow of pressure fluid to the motor and thus reverse the wipers 3 and 4, each time an end of the power piston 14 strikes one of the plugs 15 at the ends of the cylinder 13, thereby oscillating the wipers in the customary manner. Should one or both wipers encounter an obstruction on the windshield, such as ice or snow, the valve means 2 will immediately reverse the flow, whereby the wipers and the piston 14 will continue to operate with shortened strokes. When the obstruction or obstructions are removed, the motor and wipers will automatically resume full stroke operation.

The valve means 2 as here shown, includes a single piston-like, flow-reversing valve member 27 mounted to reciprocate under fluid pressure in a valve cylinder 28 formed in the body 12. Fluid passages or ports 29 and 30 are formed in the body 12 to communicate end portions of the valve cylinder 28 with end portions of the power cylinder 13, whereby hydraulic fluid under pressure and low pressure return fluid may flow into and from the cylinder 13, respectively, in the operation of motor unit 1 responsive to movements of the valve member 2.

As best shown in Figs. 3 and 4, the body 12 is provided with an inlet port 31 to which the fluid pressure line 8 is connected. The port 31 is divided to form inlet ports 32 and 33 opening at axially spaced points into the valve cylinder 28 intermediate the ends of this cylinder.

The piston-like valve member 27 has ports 34 and 35 adapted to be moved into and out of registration with the cylinder inlet ports 32 and 33 respectively. The ports 34 and 35 extend axially in opposite directions in the valve member 27 from points intermediate the ends of the valve member, with their inner ends 34a and 35a opening on a side of the valve member so as to be moved into and out of registration with the valve cylinder inlet ports 32 and 33, respectively, as the valve member is reciprocated. The outer ends 34b and 35b of ports 34 and 35 open at opposite ends of the valve member 27 and are in communication at all times with the end portions of the valve cylinder 28 and the passages 29 and 30.

The valve cylinder 28 is also provided with fluid return ports 36 and 37 which are alternately opened and closed by end portions of the valve member 27 and are connected with the fluid return lines 10 and 11 respectively, through which low pressure fluid is returned to the source of pressure fluid, not shown.

Detent means are provided to assure that the valve member 27 will be releasably held in positions properly to control the fluid flow to and from the motor cylinder 13. As here shown, this detent means includes a detent pin 38 slidably mounted in a tubular member 39 threaded into an opening 40 in a wall of the valve cylinder 28. A spring 41, on the reduced stem 42 of the detent pin 38, is confined between a shoulder 43 on the pin and a screw cap 44 on the member 39. This spring urges the detent pin so as to yieldably engage in notches 45 and 46 in the valve member 27. The notches 45 and 46 are V-shaped, with a beveled portion 47 therebetween. The outer end of the detent pin 38 is beveled to conform to the notches. The beveled portion 47 between the notches facilitates movement of the detent pin 38 from one notch to the other in the operation of the valve member 27.

It is desired to prevent hydraulic fluid from being trapped in the tubular member 39 and cap 44. For this purpose the detent pin 38 is flattened as at 48 along one side, and the valve member 27 is similarly flattened as at 49 along sides thereof to form flow passages allowing escape of the fluid to annular grooves 50 formed externally of the valve member. The manner in which the flattened portions 49 on the valve member 27 lead into the grooves 50 is indicated in Fig. 7. Figs. 2 and 3 show how the annular grooves 50 communicate with the fluid return ports 36 and 37 in the valve cylinder 28.

As will be hereinafter fully described, the valve member 27 in moving back and forth to reverse the application of pressure fluid to the motor cylinder 13, momentarily closes both of the valve cylinder inlet ports 32 and 33. Fig. 4 shows the position of the valve member 27 when both of the ports 32 and 33 are closed. When this takes place there is no hydraulic pressure effective in the valve cylinder 28 for moving the valve member 27. However, prior to this closing of the ports 32 and 33, hydraulic pressure in the valve cylinder 28 is effective to move the valve member 27 at least to the position shown in Fig. 4, in which the ports 32 and 33 are closed. This movement of the valve member 27 under hydraulic pressure is effected by the pressure increase or what may be termed the back pressure that is developed when the power piston 14 completes a stroke in either direction or when, due to any other cause, a load is imposed on the power piston such as will restrain its movement before a full stroke thereof is completed.

In consideration of the valve member 27 momentarily closing the inlet ports 32 and 33, force applying means are provided to cause the valve member to continue movement from one pressure flow-directing position to the other incident to the momentary closing of the ports 32 and 33. This force applying means is normally static. It develops force only while hydraulic pressure is present in the valve cylinder 28 and applies the developed force when the inlet ports 32 and 33 are momentarily closed. Thus, the force applying means prevents the valve member 27 from being stuck or held in the port-closing position shown in Fig. 4, by the detent pin 38, and assures that the valve member will be properly shifted in timed relation to the piston movements to operate the motor efficiently.

One force applying means which is exceptionally simple and requires no moving parts, has been found to be most effective for the purpose stated. This means constitutes provision for trapping and compressing air and applying the compressed air as a medium for moving the valve member 27 when the hydraulic pressure is ineffective to move this valve member. Accordingly, air pockets or chambers A are provided at opposite ends of the valve cylinder 28, in such a manner that in filling the system air will be trapped therein. This trapping and subsequent compressing of the air is assured by making the pockets or chambers of annular form.

One way in which the air compressing pockets or chambers A may be provided, consists in closing the ends of the bore of the valve cylinder 28 by means of flanged caps 52 threaded onto the ends of the cylinder and sealed by gaskets 53. The chambers or pockets A are formed by the concaved inner sides of the caps 52 and annular grooves 54 formed in the walls of the cylinder and opening outwardly into the concaved sides of the caps.

The caps 52 hold in place in the ends of the bore of the cylinder 28, tubular stop members 55 having flanged outer ends 56 confined between the outer ends of the cylinder 28 and the caps. The flanged ends 56 are provided with transverse grooves 57 assuring communication between the air chambers A and the bore of the valve cylinder 28 through the bores 58 of the stop members 55. The inner ends of the stop members are reduced, as at 59, and are disposed to serve as stops for limiting the movement of the valve member 27 to positions in which the detent pin 38 will hold the valve member against chattering and in proper positions to direct pressure fluid to the power cylinder 13.

Ordinarily the valve member 27 will move only sufficiently to cause the detent pin 38 to be moved from one of the notches 45 and 46 into the other. For example, when the valve member 27 is moved so that the detent pin 38 enters the notch 45, as shown in Figs. 2 and 3, hydraulic fluid pressure is effective through the valve port 35, passage 30 and the right end of the power cylinder 13, to move the piston 14 to the left. In this movement of the valve member 27 the detent pin 38 becomes squarely seated in the notch 45 and arrests movement of the valve member before the right end of the valve member encounters the adjacent stop member 55. However, if for any reason the valve member 27 is moved past the position in which the detent pin 38 seats fully in one of the notches 45 and 46, one of the stop members 55 will arrest the movement of the valve member before the detent pin is moved entirely out of the notch 45 or 46 as the case may be. Thus, the detent pin 38 will releasably hold the valve member 27 in proper position under all conditions of operation of the valve member.

The portions of the ports 34 and 35 in the valve member 27 which extend axially of the valve member are off center, as shown in Fig. 7, and thereby are out of alignment with the bores 58 in the stop members 55. With this arrangement and the reduced ends 59 of the stop members 55, it will be apparent, with reference to Fig. 2, that should the valve member 27 engage one of the stop members, for example the stop member 55 at the right end of the valve cylinder 28, this stop member will not impair or prevent the flow of pressure fluid from the end 35b of the port 35 into the passage 30, nor will it prevent the hydraulic pressure from being effective through the stop member bores 58 and in the chambers A for compressing the air in these chambers.

In the operation of the motor and valve unit of the invention, upon opening the valve 9, hydraulic pressure in the closed and filled system will be effective through one or the other of the inlet ports 32 and 33 in the valve cylinder, as the valve member 27 is always disposed in one or the other of its two operative positions when the operation of the motor is stopped or started. Assuming that the valve member 27 is in the position shown in Figs. 2 and 3 at the start of the operation of the motor, then the pressure fluid is effective through the port inlet 33, valve port 35, right end of valve cylinder 28, passage 30 and power cylinder 13, thereby moving the power piston 14 to the left. During this movement of the piston 14, the fluid in the cylinder 13 to the left of the piston is returned to the source of pressure fluid through the passage 29, left end of the valve cylinder 28, return port 36 (then open as shown in Fig. 2), and the return line 10. When the piston 14 reaches the end of its stroke and encounters the stop member 15 at the left end of the cylinder 13, the hydraulic pressure immediately builds up and creates a back pressure against the right end of the valve member 27. During the application of the fluid pressure to the piston and particularly when the pressure increases at the end of the piston stroke, these pressures are effective in the air chambers A to compress the air therein. However, incident to the aforementioned pressure increase or back pressure being developed, the valve 27 is moved to the left, the detent pin 38 then camming out of the notch 45. About the same time that the detent pin 38 rides upon the beveled portion 47 between the notches 45 and 46, the valve member will have been moved by the hydraulic back pressure so as to close the inlet ports 32 and 33, thereby shutting off the application of pressure to the valve cylinder 28. Incident to this shutting off of hydraulic pressure, the air compressed in the right hand air chamber A is effective to continue the movement of the valve member to the position in which it closes return port 36 and inlet port 33 and opens inlet port 32, thereby applying pressure fluid through the valve port 34 and passage 29 and moving the piston 14 to the right. As the piston 14 moves to the right, the fluid ahead of it returns to the source of pressure fluid, through the passage 30, return port 37 (then open) and return line 11.

When the piston 14 completes its stroke to the right, the pressure builds up against the left end of the valve member 27 and moves it to a position for closing ports 32 and 33. Incident to the closing of the ports 32 and 33, the air compressed in the left hand chamber A during movement of the piston to the upper right and as a result of the increased pressure, becomes effective to move the valve member back to the position shown in Figs. 2 and 3 for again moving the piston to the left. These operations are repeated as long as the fluid pressure is intermittently applied to the valve unit 2 as above noted.

Should the piston 14 be restrained before completing a full stroke, the increased pressure and compressed air will reverse the valve member 27 which, as hereinbefore described, will continue its operation in a manner producing a shortened piston stroke and will resume operation to provide a full piston stroke when the restraint on the piston is removed.

The compressed air effected movement is instantaneous with the cessation of the hydraulic pressure effected movement of the valve member 27 so that the valve member maintains an effective reciprocable operation of the power piston. When the motor is applied to a windshield wiper system as here shown, it will operate the system in a highly efficient manner with the advantages hereinbefore noted.

I claim:

1. Control means for a reciprocable hydraulically operated motor, comprising: a valve unit providing a cylinder having inlet ports and return ports for connection with a source of hydraulic pressure fluid; a reciprocable fluid pressure-responsive valve member movable in said cylinder between predetermined positions; said unit providing passages for communicating said cylinder with said motor; said valve member having means cooperable with said inlet and return ports for reversing the flow of hydraulic fluid through said passages responsive to fluid pressure-effected movements of said valve member from one of said predetermined positions to the other; and means providing air-containing chambers within the ends of said cylinder and at all times in communication with said passages whereby the air is compressed therein by the hydraulic pressure being applied to the motor and is applied to effect movement of said valve member into said positions.

2. Control means for a reciprocable hydraulically operated motor, comprising: a valve unit providing a cylinder having inlet ports and a return port for connection with a source of hydraulic pressure fluid; a reciprocable fluid pressure-responsive valve member movable in said cylinder between predetermined positions; said unit providing passages for communicating said cylinder with said motor; said valve member having means cooperable with said inlet and return ports for reversing the flow of hydraulic fluid through said passages responsive to fluid pressure-effected movements of said valve member from one of said predetermined positions to the other; and means providing annular air-containing chambers within the ends of said cylinder and in constant communication through said cylinder with said passages whereby the air is compressed therein responsive to hydraulic pressure in said cylinder; and means providing for the movement of said valve member into predetermined positions responsive to hydraulic pressure and said compressed air in said chambers.

3. Control means for a reciprocable hydraulically operated motor, comprising: a valve unit providing a cylinder having inlet ports and return ports for connection with a source of hydraulic pressure fluid; a reciprocable fluid pressure-responsive valve member movable in said cylinder between predetermined positions; said unit providing passages for communicating said cylinder with said motor; said valve member having means cooperable with said inlet and return ports for reversing the flow of hydraulic fluid through said passages responsive to fluid pressure-effective movements of said valve member from one of said predetermined positions to the other; said valve member momentarily closing said inlet and return ports when moving from one of said predetermined positions toward the other of said predetermined positions; and means forming closures for the ends of said cylinder and providing within said cylinder, chambers in which air is compressed responsive to the hydraulic pressure in said cylinder and for applying the compressed air to move said valve member into said positions when said ports in said cylinder are closed.

4. Control means for a reciprocable hydraulically operated motor, comprising: a valve unit providing a cylinder having inlet and return ports for connection with a source of hydraulic pressure fluid; a reciprocable fluid pressure-responsive valve member movable in said cylinder between predetermined positions; said unit providing passages for communicating said cylinder with said motor; said valve member having means cooperable with said inlet and return ports for reversing the flow of hydraulic fluid through said passages responsive to fluid pressure-effective movements of said valve member from one of said predetermined positions to the other; said valve member momentarily closing said inlet and return ports when moving from one of said predetermined positions toward the other; detent means releasably holding said valve member in said predetermined positions; said valve member being responsive to hydraulic pressure to move into said port-closing position; and means embodied within said cylinder and in constant communication through end portions of the cylinder, with said passages operable responsive to hydraulic pressure in said cylinder to compress air and operable responsive to said closing of said ports to apply the compressed air for moving said valve member into said predetermined positions.

5. Control means for a reciprocable hydraulically operated motor, comprising: a valve unit providing a cylinder having inlet and return ports for connection with a source of hydraulic pressure fluid; a reciprocable fluid pressure-responsive valve member movable in said cylinder between predetermined positions; said unit providing passages for communicating said cylinder with said motor; said valve member having means cooperable with said inlet and return ports for reversing the flow of hydraulic fluid through said passages responsive to fluid pressure-effected movements of said valve member from one of said predetermined positions to the other; said valve member momentarily closing said inlet and return ports when moving from one of said predetermined positions toward the other; said valve member being movable out of one of said predetermined positions into said port closing position responsive to increase of the hydraulic pressure in said cylinder when the motor is restrained in its operation while hydraulic pressure is applied thereto; means closing the ends of said cylinder; and means within said cylinder between said closure means and said passages operable responsive to said closing of said ports for applying a force for moving said valve member out of said port closing position into said predetermined positions.

6. Control means for a reciprocable hydraulically operated motor, comprising: a valve unit providing a cylinder having inlet and return ports for connection with a source of hydraulic pressure fluid; a reciprocable fluid pressure-responsive valve member movable in said cylinder between predetermined positions; said unit providing passages for communicating said cylinder with said motor; said valve member having means cooperable with said inlet and return ports for reversing the flow of hydraulic fluid through said passages responsive to fluid pressure-effected movements of said valve member from one of said predetermined positions to the other; said valve member momentarily closing said inlet and return ports when moving from one of said predetermined positions toward the other; said valve member being movable out of one of said predetermined positions into said port closing position responsive to increase of the hydraulic pressure in said cylinder when the motor is restrained in its operation while hydraulic pressure is applied thereto; means closing the ends of said cylinder; means embodied in said closure means and the ends of said cylinder respectively, cooperable responsive to said closing of said ports for applying a force for moving said valve member out of said port closing position into said predetermined positions; and detent means releasably holding said valve member in said predetermined positions.

7. Control means for a reciprocable hydraulically operated motor, comprising: a valve unit providing a cylinder having inlet and return ports for connection with a source of hydraulic pressure fluid; a reciprocable fluid pressure-responsive valve member movable in said cylinder between predetermined positions; said unit providing passages for communicating said cylinder with said motor; said valve member having means cooperable with said inlet and return ports for reversing the flow of hydraulic fluid through said passages responsive to fluid pressure-effected movements of said valve member; detent means releasably holding said valve member in said predetermined positions; and means within the ends of said cylinder providing air-containing chambers in communication with said passages through portions of the bore of said cylinder; said valve member momentarily closing said ports when moving from one of said positions to the other; said valve member being movable responsive to increase in hydraulic pressure developed in said cylinder when the motor is restrained in its operation while the hydraulic pressure is applied to the motor; said air chambers surrounding said ends of said cylinder and arranged to cause the air therein to be compressed by the hydraulic pressure in said cylinder and to apply the compressed air to said cylinder for moving said valve member from said port-closing position into said predetermined position incident to said closing of said ports.

8. Control means for a reciprocable hydraulically operated motor, comprising: a valve unit providing a cylinder having an inlet and return ports for connection with a source of hydraulic pressure fluid; a reciprocable fluid pressure-responsive valve member movable in said cylinder between predetermined positions; said unit providing passages for communicating said cylinder with said motor; said valve member having means cooperable with said inlet and return ports for reversing the flow of hydraulic fluid through said passages responsive to fluid pressure-effected movements of said valve member from one of said predetermined positions to the other; said valve member momentarily closing said inlet and return ports when moving from one of said predetermined positions toward the other of said predetermined positions; said valve member being movable out of one of said predetermined positions into said port closing position responsive to increase of the hydraulic pressure in said cylinder when the motor is restrained in its operation while hydraulic pressure is applied thereto; said cylinder having an annular groove exteriorly thereof at each cylinder end; and a member mounted on each cylinder end closing the adjacent end of the cylinder bore; each of said last named members and each of said grooves forming an air-containing chamber in which air is compressed responsive to hydraulic fluid in said cylinder and which applies the compressed air to move said valve member into said predetermined positions upon said closing of said ports.

9. Control means for a reciprocal hydraulically operated motor, including: a valve unit providing a cylinder having inlet and return ports for connection with a source of hydraulic pressure fluid; a reciprocable fluid pressure-responsive valve member movable in said cylinder between predetermined positions; said unit providing passages for communicating said cylinder with said motor; said valve member having means copperable with said inlet and return ports for reversing the flow of hydraulic fluid through said passages responsive to fluid pressure-effected movements of said valve member from one of said predetermined positions to the other; said valve member momentarily closing said inlet and return ports when moving from one of said predetermined positions toward the other; said valve member being movable out of one of said predetermined positions into said port closing position responsive to increase of the hydraulic pressure in said cylinder when the motor is restrained in its operation while hydraulic pressure is applied thereto; said cylinder having an annular groove exteriorly thereof at each cylinder end; and a member mounted on each cylinder end and closing the adjacent end of the cylinder bore; each of said mmebers and each of said grooves forming an air-containing chamber in which air is comprssed responsive to hydraulic fluid in said cylinder and which applies the compressed air to move said valve member into said predetermined positions upon said closing of said ports; and a spring loaded detent member carried by said unit and extending into said cylinder; said valve member having notches therein in which said detent member is engageable to releasably hold said valve member in said predetermined positions.

10. Control means for a reciprocable hydraulically operated motor, comprising: a valve unit providing a cylinder having inlet and return ports for connection with a source of hydraulic pressure fluid; a reciprocable fluid pressure-responsive valve member movable in said cylinder between predetermined positions; said unit providing passages for communicating said cylinder with said motor; said valve member having means cooperable with said inlet and return ports for reversing the flow of hydraulic fluid through said passages responsive to fluid pressure-effected movements of said valve member from one of said predetermined positions to the other; said valve member momentarily closing said inlet and return ports when moving from one of said predetermined positions toward the other; said valve member being movable out of one of said predetermined positions into said port closing position responsive to increase of the hydraulic pressure in said cylinder when the motor is restrained in its operation while hydraulic pressure is applied thereto; said cylinder having an annular groove exteriorly thereof at each cylinder end; and a member mounted on each cylinder end and closing the adjacent end of the cylinder bore; each of said members and each of said grooves forming an air-containing chamber in which air is compressed responsive to hydraulic fluid in said cylinder and which applies the compressed air to move said valve member into said predetermined positions upon said closing of said ports; a spring loaded detent member carried by said unit and extending into said cylinder; said valve member having notches therein in which said detent member is engageable to releasably hold said valve member in said predetermined positions; and tubular stop members in the ends of said cylinder bore; said stop members having bores communicating said air chambers with said cylinder bore; said stop members being disposed to stop said valve member from movement in either direction past a position which would move the detent member out of either of said notches.

11. Control means for a reciprocable hydraulically operated motor, comprising: a valve unit providing a cylinder having inlet and return ports for connection with a source of hydraulic pressure fluid; a reciprocable fluid pressure-responsive valve member movable in said cylinder between predetermined positions; said unit providing passages for communicating said cylinder with said motor; said valve member having a pair of ports extending from open ends of the ports on a side of the valve member, axially in opposite directions through the ends of the valve member; said inlet ports being spaced alternately to communicate with said open ends of said valve ports on reciprocation of said valve member; said valve member including portions for momentarily closing said inlet ports and said return ports during movement of the valve member between said predetermined positions; said passages communicating with said cylinder at points spaced from opposite ends of said valve member; said valve member being movable in said cylinder responsive to an increase in hydraulic pressure in said cylinder when said motor is restrained in its operation while hydraulic pressure is applied to the motor through said passages; and means operable responsive to said closing of said ports for moving said valve member into said predetermined positions.

12. Control means for a reciprocable hydraulically operated motor, comprising: a valve unit providing a cylinder having inlet and return ports for connection with a source of hydraulic pressure fluid; a reciprocable fluid pressure-responsive valve member movable in said cylinder between predetermined positions; said unit providing passages for communicating said cylinder with said motor; said valve member having a pair of ports extending from open ends of the ports on a side of the valve member axially in opposite directions through the ends of the valve member; said inlet ports being spaced alternately to communicate with said open ends of said valve ports on reciprocation of said valve member; said valve member including portions for momentarily closing said inlet ports and said return ports during movement of the valve member between said predetermined positions; said passages communicating with said cylinder at points spaced from opposite ends of said valve member; said valve member being movable in said cylinder responsive to an increase in hydraulic pressure in said cylinder when said motor is restrained in its operation while hydraulic pressure is applied to the motor through said passages; and means providing air chambers surrounding the ends of said cylinder; said chambers being in constant communication through said cylinder with said passages and operable for compressing air while hydraulic pressure is present in said cylinder and for applying compressed air to move said valve member into said predetermined positions upon said closing of said ports.

13. In a hydraulic motor; a cylinder; a piston reciprocable in said cylinder; said piston having sealing rings mounted on opposite ends thereof in sealing engagement with said cylinder; said cylinder having a slot intermediate the ends thereof; power take-off means connected with said piston and extending through said slot; valve means operatively connected with said cylinder for controlling the application thereto of hydraulic fluid under pressure for reciprocating said piston; said valve means including a valve cylinder joined to said first named cylinder and adapted to be connected with a source of supply of fluid under pressure; a valve member in said valve cylinder movable into predetermined positions for directing fluid under pressure to said cylinder to reciprocate said piston; said valve member being movable from said positions responsive to hydraulic pressure when said piston is restrained from movement during application of fluid pressure thereto; means embodied in said valve member operable to shut off the pressure fluid to said cylinder when said valve member is moved between said predetermined positions by said hydraulic pressure; and means providing within the ends of said valve cylinder air pockets for trapping and compressing air therein responsive to application of fluid pressure for operating said piston; said compressed air being effective to move said valve member into said predetermined positions incident to said shutting off said hydraulic pressure.

14. A hydraulic motor comprising: a cylinder having a port adjacent each end thereof; a piston reciprocable in said cylinder; power take-off means connected with said piston; means providing a pair of passages communicating with said ports; a valve cylinder communicating adjacent its ends with said passages; said valve cylinder having fluid pressure inlet ports adapted for connection with a source of hydraulic pressure fluid; said valve cylinder having return ports adapted to be connected with said source; a valve member reciprocable in said valve cylinder; said valve member having port means cooperable with said inlet and return ports for reversing the flow of hydraulic fluid through said passages according to movement of said valve member into predetermined positions; said valve member closing said inlet ports and said return ports in moving between said predetermined positions; detent means releasably holding said valve member in said predetermined positions; said valve member being movable from said predetermined positions into said port closing position in response to increase of hydraulic pressure thereagainst when said piston is restrained against movement while hydraulic pressure is effective against an end of the piston; and means providing annular air-containing pockets within the ends of the valve cylinder and in which air is compressed responsive to hydraulic pressure in said valve cylinder; said compressed air being effective to move said valve member into said predetermined positions when said valve member closes said inlet and return ports.

15. Control means for a reciprocable hydraulically operated motor, comprising: a valve unit providing a cylinder having inlet ports and return ports for connection with a source of hydraulic pressure fluid; a reciprocable fluid pressure-responsive valve member movable in said cylinder between predetermined positions; said unit providing passages including constantly open ports communicating said cylinder with said motor; said valve member having means cooperable with said inlet and return ports for reversing the flow of hydraulic fluid through said passages responsive to fluid pressure-effected movements of said valve member from one of said predetermined positions to the other; air-containing chambers constantly in communication with said passages and said constantly open ports whereby the air is compressed therein by the hydraulic pressure being applied to the motor and is applied to effect movement of said valve member into said positions; said valve member having a pair of notches separated by a beveled portion having a pointed end; and a spring loaded detent member carried by said cylinder; said detent member having a beveled end slidably engageable with said beveled portion when entering said notches to releasably hold said valve member in said predetermined positions.

16. Control means for a reciprocable hydraulically operated motor, comprising: a valve unit providing a cylinder having inlet ports and return ports for connection with a source of hydraulic pressure fluid; a reciprocable fluid pressure-responsive valve member movable in said cylinder between predetermined positions; said unit providing passages for communicating said cylinder with said motor; said valve member having means cooperable with said inlet and return ports for reversing the flow of hydraulic fluid through said passages responsive to fluid pressure-effected movements of said valve member from one of said predetermined positions to the other; means providing air-containing chambers within the ends of said cylinder at all times in communication with said said cylinder at all times in communication with said passages whereby the air is compressed therein by the hydraulic pressure being applied to the motor and is applied to effect movement of said valve member into said positions; and tubular members mounted in the ends of the bore of said cylinder and communicating said passages with said chambers, said tubular members being disposed as stops to limit movement of said valve member; the bores of said tubular members providing for communication of said passages and said bore of said cylinder with said chambers in all positions of said valve member.

17. A control valve for a reciprocable hydraulic motor comprising: a cylinder having ports for communication with a source of hydraulic fluid under pressure; a piston valve member reciprocable in the bore of said cylinder responsive to hydraulic pressure for opening and closing said ports; said valve member having means providing for communication of said ports with portions of said bore between the ends of said valve member and the ends of said cylinder; a pair of chambers containing a compressible fluid; and means providing passages communicating said chambers with said portions of said bore; said cylinder having ports in communication with said portions of said bore and said passages; said last named ports being adapted for communication with a reciprocal hydraulic motor.

18. A control valve for a reciprocable hydraulic motor comprising: a cylinder having an intake port adapted to be communicated with a source of hydraulic fluid under pressure; said cylinder having a pair of return ports adapted to return fluid to said source; a piston valve reciprocable in the bore of said cylinder under fluid pressure for controlling flow through said intake and return ports; said valve means having passages for communicating said intake port with portions of said bore between the ends of said valve member and the ends of said cylinder; said return ports being disposed alternately to communicate with said portions of said bore responsive to reciprocation of said valve member; a pair of chambers containing a compressible fluid; and means providing passages communicating said chambers with said portions of said bore; said cylinder having motor ports in communication with said portions of said bore and said passages; said motor ports being adapted for communication with a hydraulic reciprocable motor.

19. A control valve for reciprocable hydraulic motor comprising: a cylinder having ports for communication with a source of hydraulic fluid under pressure; a piston valve member reciprocable in the bore of said cylinder responsive to hydraulic pressure for opening and closing said ports; said valve member having means providing for communication of said ports with portions of said bore between the ends of said valve member and the ends of said cylinder; and means mounted on the ends of said cylinder providing chambers containing a compressible fluid; said cylinder having passage means affording direct communication between said portions of said bore and said chambers; said cylinder having motor ports in communication with said portions of said bore and said passage means; said motor ports being adapted for communication with a hydraulic reciprocable motor.

20. A control valve for a reciprocable hydraulic motor comprising: a cylinder having ports for communication with a source of hydraulic fluid under pressure; a piston valve member reciprocable in the bore of said cylinder responsive to hydraulic pressure for opening and closing said ports; said valve member having means providing for communication of said ports with portions of said bore between the ends of said valve member and the ends of said cylinder; and means mounted on the ends of said cylinder providing chambers surrounding the ends of said cylinders and containing a compressible fluid; said cylinder having passage means affording direct communication between said portions of said bore and said chambers; said cylinder having motor ports in communication with said portions of said bore and said passage means; said motor ports being adapted for communication with a hydraulic reciprocable motor.

21. A hydraulic motor comprising: a power cylinder having ports; a piston reciprocable in said cylinder; power take-off means connected with said piston; a valve cylinder having ports adapted for communication with a source of hydraulic fluid under pressure; a piston valve member reciprocable in the bore of said valve cylinder under fluid pressure for controlling flow through said ports in said valve cylinder; said valve member having means providing for communication of said ports with portions of said bore between the ends of said valve member and the ends of said valve cylinder; a pair of chambers containing a compressible fluid; means providing passages communicating said chambers with said portions of said bore; said valve cylinder having ports which open into said portions of said bore; and means providing passages between said last named ports and said ports in said power cylinder; said last named passages affording communication between said power cylinder and said chambers through said last named ports, said portions of said bore and the passages which communicate said portions of said bore with said chambers.

References Cited in the file of this patent

UNITED STATES PATENTS

| | | |
|---|---|---|
| 2,298,457 | Berges | Oct. 13, 1942 |
| 2,302,232 | MacNeil | Nov. 17, 1942 |
| 2,443,568 | Palm | June 15, 1948 |
| 2,550,723 | Ross | May 1, 1951 |
| 2,555,018 | Von Seggern | May 29, 1951 |
| 2,698,517 | Witt | Jan. 4, 1955 |

FOREIGN PATENTS

| | | |
|---|---|---|
| 992,359 | France | July 11, 1951 |

UNITED STATES PATENT OFFICE
Certificate of Correction

Patent No. 2,864,342                                                          December 16, 1958

Lynn J. Ziegelmeyer

It is hereby certified that error appears in the printed specification of the above numbered patent requiring correction and that the said Letters Patent should read as corrected below.

Column 11, line 59, strike out "said cylinder at all times in communication with said".

Signed and sealed this 28th day of April 1959.

[SEAL]

Attest:
T. B. MORROW,
*Attesting Officer.*

ROBERT C. WATSON.
*Commissioner of Patents.*